United States Patent
Levy et al.

(10) Patent No.: US 7,216,666 B2
(45) Date of Patent: May 15, 2007

(54) DEVICE FOR REELING-IN A HOSE

(76) Inventors: Avraham Levy, 3 Hayated Street Industrial Zone, Holon (IL); Ronny Shatan, 14 Gisin Street, Petach-Tikva (IL)

( * ) Notice: Subject to any disclaimer, the term of this patent is extended or adjusted under 35 U.S.C. 154(b) by 0 days.

(21) Appl. No.: 11/168,064

(22) Filed: Jun. 28, 2005

(65) Prior Publication Data
US 2006/0000935 A1   Jan. 5, 2006

(30) Foreign Application Priority Data
Jun. 30, 2004   (IL) .................................. 162797

(51) Int. Cl.
*B65H 75/34*   (2006.01)
(52) U.S. Cl. ..................... 137/355.22; 137/355.19; 137/355.26
(58) Field of Classification Search ........... 137/355.19, 137/355.22, 355.26; 242/390.6, 481
See application file for complete search history.

(56) References Cited

U.S. PATENT DOCUMENTS

| | | | | |
|---|---|---|---|---|
| 3,628,731 A | * | 12/1971 | Phillips | ............ 239/745 |
| 3,684,178 A | * | 8/1972 | Friedlander | .......... 239/745 |
| 3,972,478 A | * | 8/1976 | Groelz | ............. 239/748 |
| 4,003,519 A | * | 1/1977 | Kruse et al. | .......... 239/745 |
| 4,174,809 A | * | 11/1979 | Arlemark | ............ 239/745 |
| 4,186,881 A | * | 2/1980 | Long | ............... 239/198 |
| 4,276,900 A | * | 7/1981 | Rosenqvist | ........... 239/745 |
| 4,445,643 A | * | 5/1984 | Thorsby et al. | ........ 239/745 |
| 4,813,627 A |  | 3/1989 | Nelson |  |
| 4,950,130 A | * | 8/1990 | Erlach | ............. 415/202 |
| 5,560,391 A |  | 10/1996 | Bantaculo |  |
| 6,178,992 B1 |  | 1/2001 | Van Der Paal |  |
| 6,443,697 B1 | * | 9/2002 | Rossi et al. | .......... 415/202 |
| 6,488,224 B1 |  | 12/2002 | Hiebenthal |  |

FOREIGN PATENT DOCUMENTS

WO    WO 03/078797 A1    9/2003

* cited by examiner

*Primary Examiner*—A. Michael Chambers
(74) *Attorney, Agent, or Firm*—Milde & Hoffberg, LLP

(57) ABSTRACT

There is provided an hydraulic reeling-in device for a water-transmitting, flexible hose, having mounting elements, a hose reel, an hydraulic driver kinematically connected to the hose reel, a water inlet connectable to a water-supplying pipe line and a water outlet provided with a connector for the hose. There is further provided a valve having two positions, a first position in which the water is permitted to pass from the water inlet through the water outlet into the hose, and a second position in which water is permitted to pass from the water inlet to the hydraulic driver in order to reel-in the hose, and a tubular member adapted, in the second position of the valve, to conduct water to the hydraulic driver.

13 Claims, 16 Drawing Sheets

DEVICE FOR REELING-IN A HOSE

FIELD OF THE INVENTION

The present invention relates to a reeling-in device for a flexible hose, e.g., a garden hose.

BACKGROUND OF THE INVENTION

Such devices which are intended to replace the bothersome manual rewinding of the hose after use are known. PCT Application WO 03/078797 for instance, discloses a reciprocating water piston motor which drives the reel. The same purpose is accomplished in U.S. Pat. Nos. 4,813,627 and 5,560,391, which use a spiral spring that is loaded upon unwinding. Similarly spring-loaded is a device disclosed by U.S. Pat. No. 6,488,224 that also features a hydraulic brake governor to maintain a more or less constant rewinding speed. U.S. Pat. No. 6,178,992 uses an electric motor as power source.

All these devices are, however, cumbersome, complex, expensive and, what is most important, unsafe.

DISCLOSURE OF THE INVENTION

It is thus one of the objects of the present invention is to overcome the drawbacks and disadvantages of the prior-art devices and to provide a reeling-in device that is relatively light, simple, inexpensive and, above all, safe.

This the invention achieves by providing an hydraulic reeling-in device for a water-transmitting, flexible hose, comprising mounting means including ground-contacting supporting elements; a hose reel; hydraulic drive means kinematically connected to said hose reel and mounted on said mounting means; a water inlet attached to said mounting means and connectable to a water-supplying pipe line; a water outlet leading to a point at the periphery of said hose reel and provided with a connector for said hose; valve means located on said mounting means and having two positions, a first position in which said water is permitted to pass from said water inlet through said water outlet into said hose, and a second position in which water is permitted to pass from said water inlet to said hydraulic drive means in order to reel-in said hose, and a tubular member connectable to said mounting means and adapted, in the second position of said valve means, to conduct water to said hydraulic drive means.

BRIEF DESCRIPTION OF THE DRAWINGS

The invention will now be described in connection with certain preferred embodiments with reference to the following illustrative figures, so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a perspective view of the assembled device as seen from the uncovered turbine side and without the hose;

FIG. 2 is a similar view, but as seen from the valve side;

FIG. 3 represents a general cross-sectional view of the device including the turbine and the hose socket;

FIG. 4 is an enlarged cross-sectional view of the turbine side of the device;

FIG. 5 shows a similarly enlarged view of the valve side of the device;

FIG. 6 illustrates the turbine wheel and its nozzle;

FIG. 7 shows the device without the hose reel and the flanges;

FIG. 8 depicts the valve unit;

FIG. 9 illustrates the ducting of the water inside the device;

FIG. 10 is a perspective view of a further embodiment of a turbine wheel and inlet tubes;

FIG. 11 is a perspective view of the planetary gear with the crown gear removed;

Figure 10:
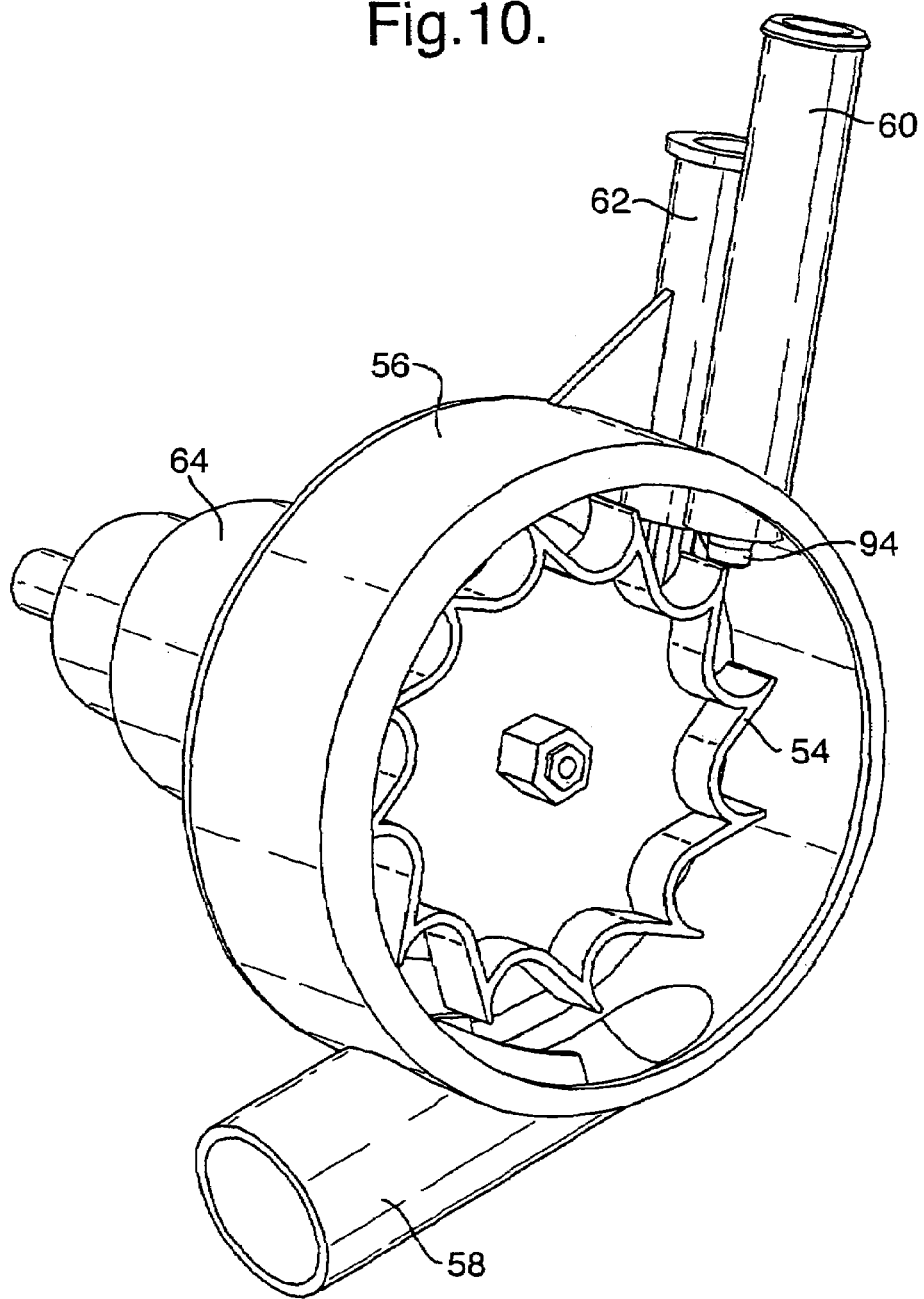
Figure 12:
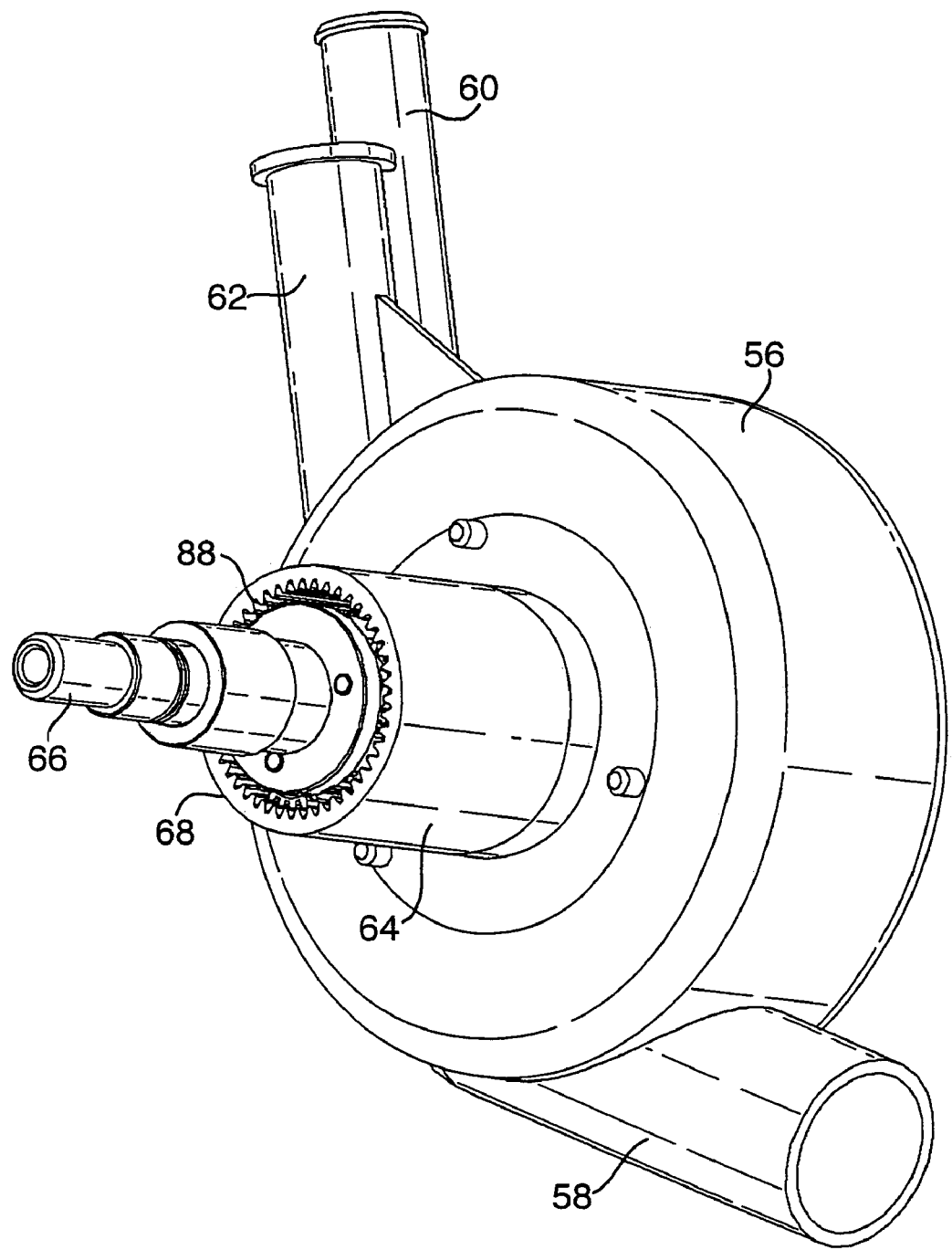
Figure 13:
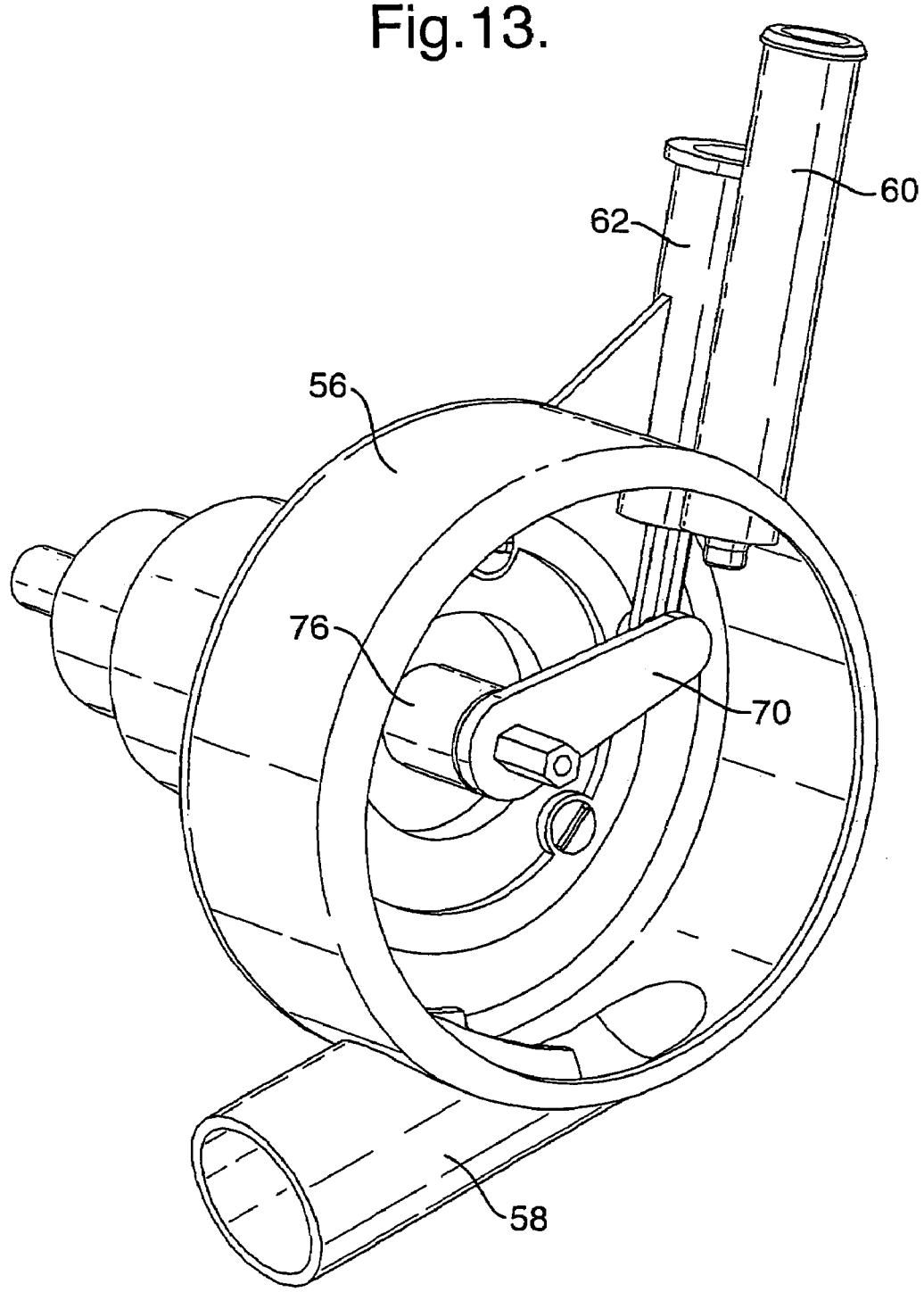
Figure 14:
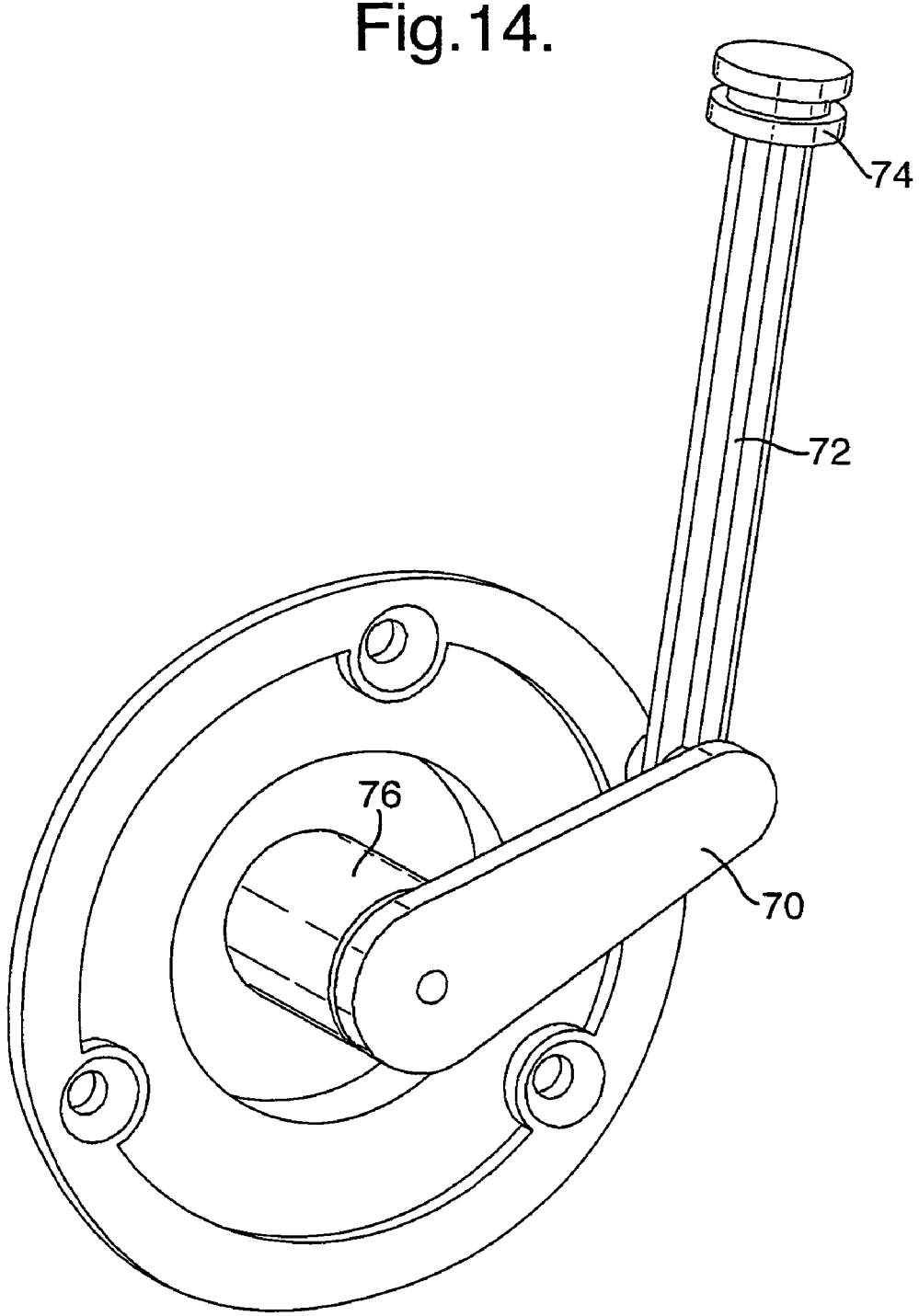

FIG. 12 is a perspective view of the crown gear and gear output shaft;

FIG. 13 is a perspective view of the embodiment of FIG. 10 with the turbine wheel removed, showing the actuating lever;

FIG. 14 is a perspective view of the lever, piston rod and piston, and

Figure 15:
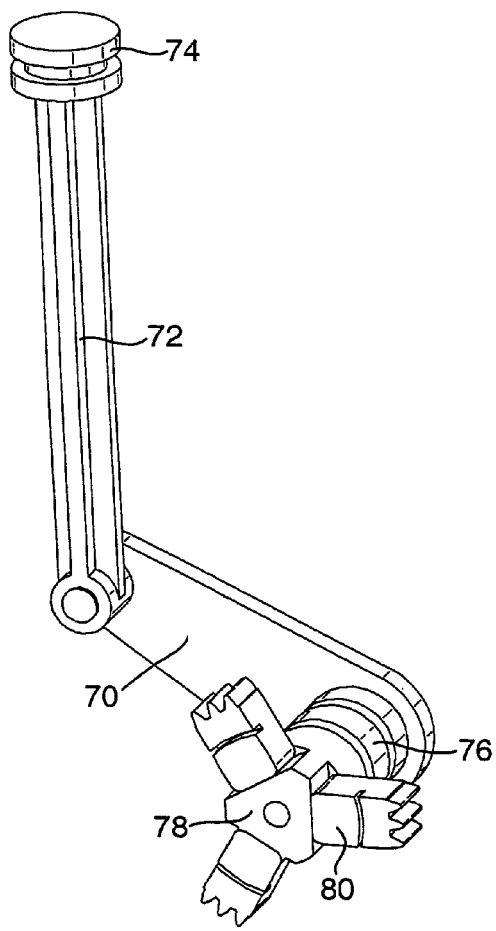
Figure 17:
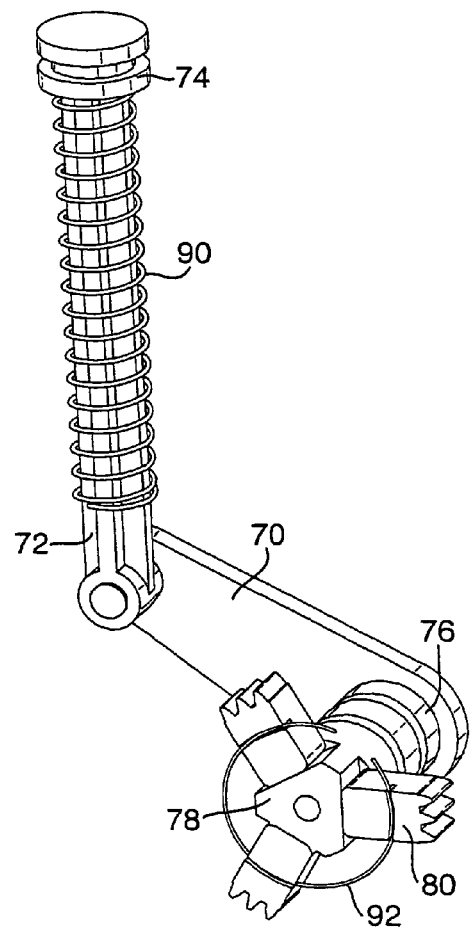
Figure 16:
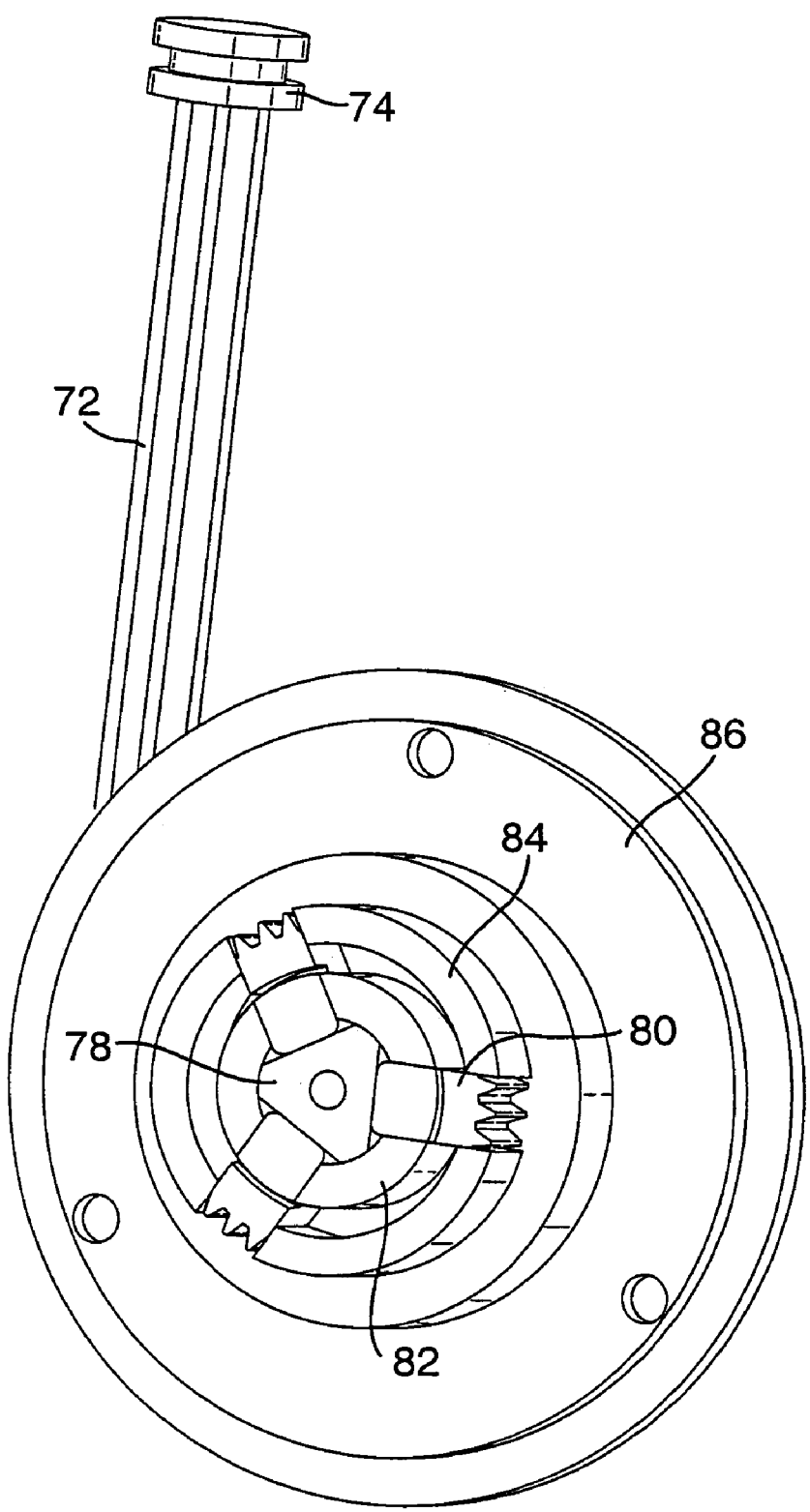

FIGS. 15 to 17 show perspective views of the crown gear-engaging mechanism.

DETAILED DESCRIPTION OF PREFERRED EMBODIMENTS

Figure 1:
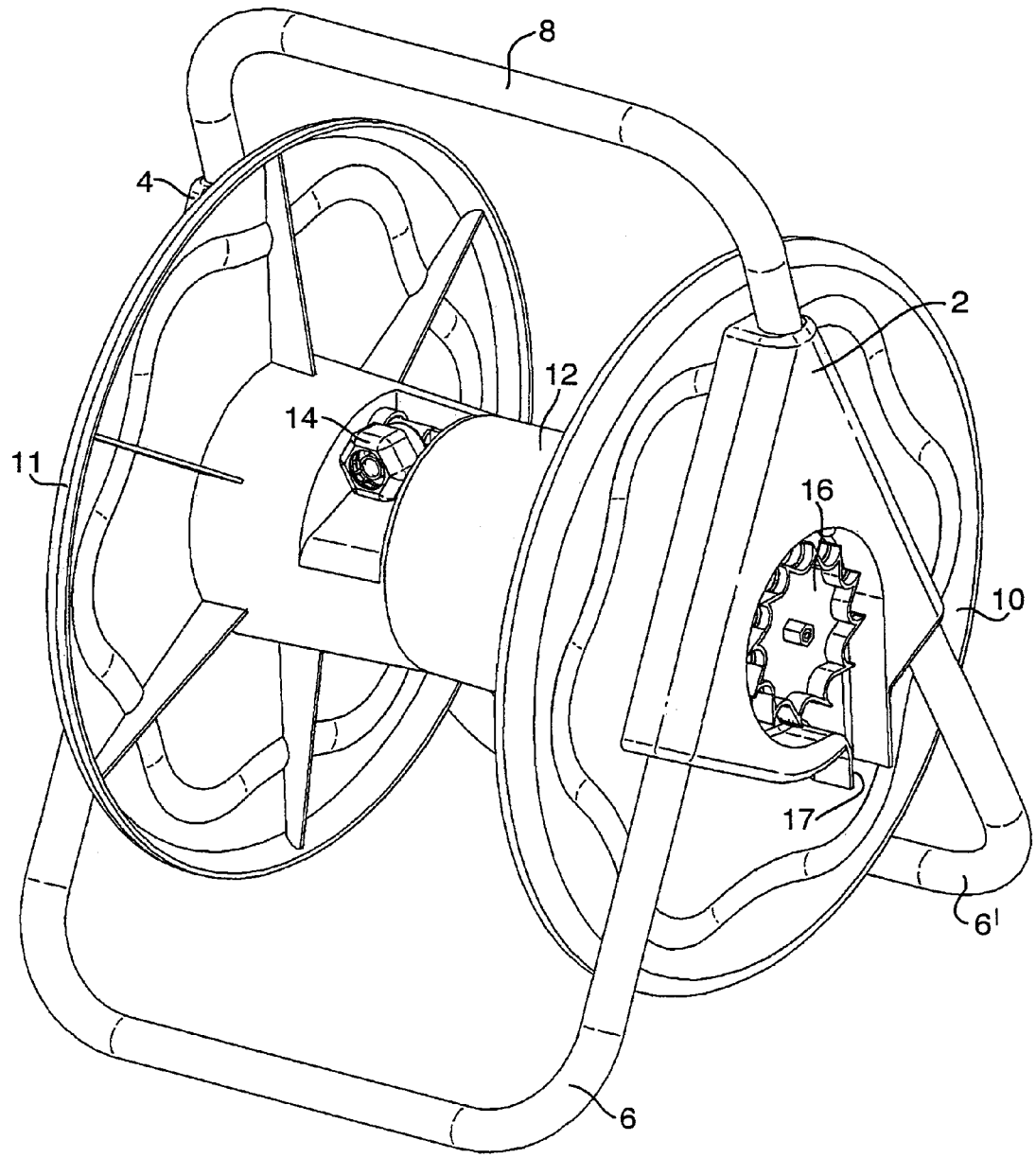

Referring now to the drawings, there is shown in FIG. 1 a perspective view of the assembled device as seen from the side of the uncovered turbine, and without the watering hose. There are seen two mounting bodies 2 and (barely visible) 4, complete with ground-contacting, substantially U-shaped supporting members 6, 6' and a tubular handle 8 which, apart from its carrying task, has also further uses to be discussed further below.

Supporting members 6, 6' could, however, also be integral parts of mounting means 2, 4.

Figure 4:
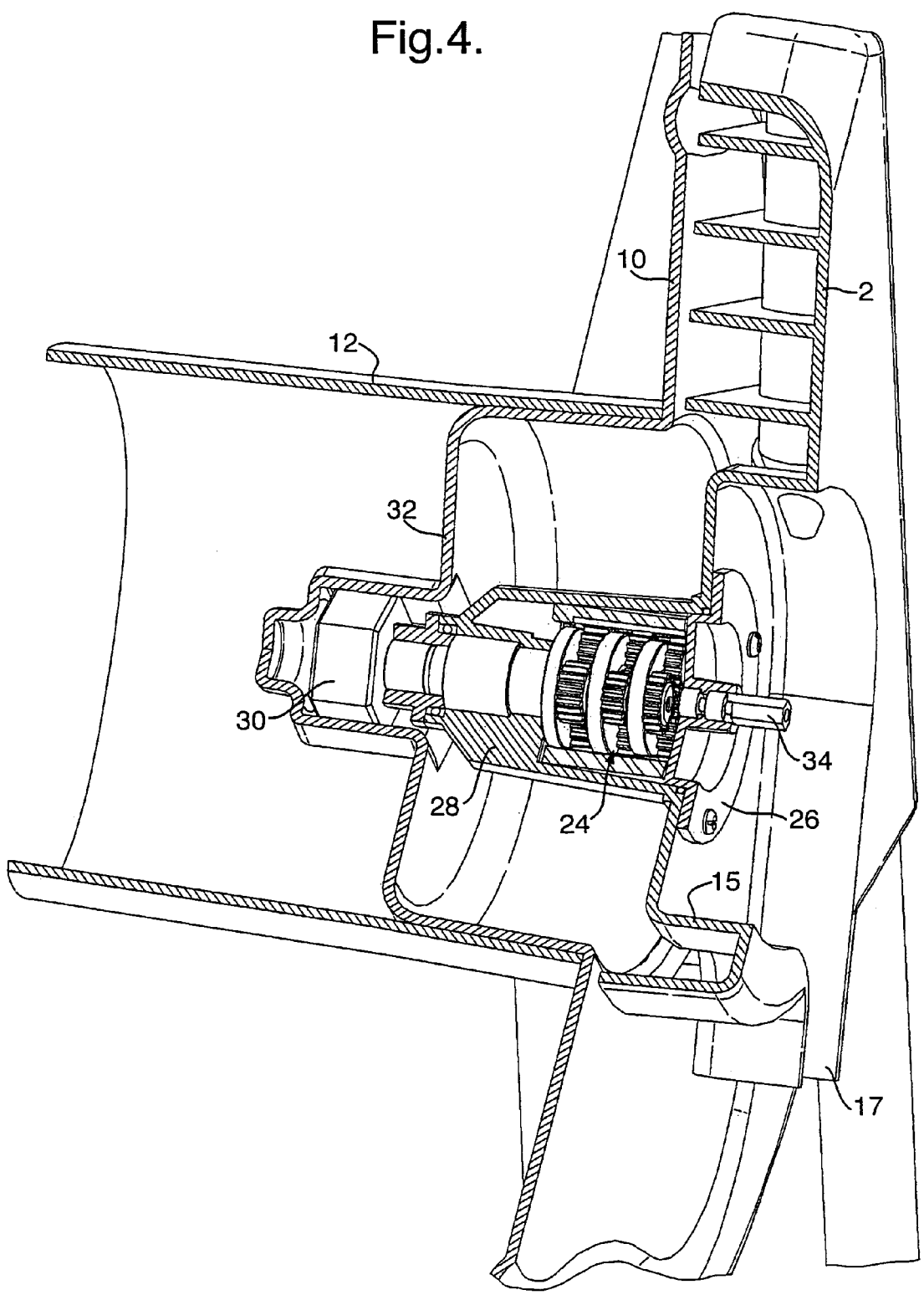
Figure 5:
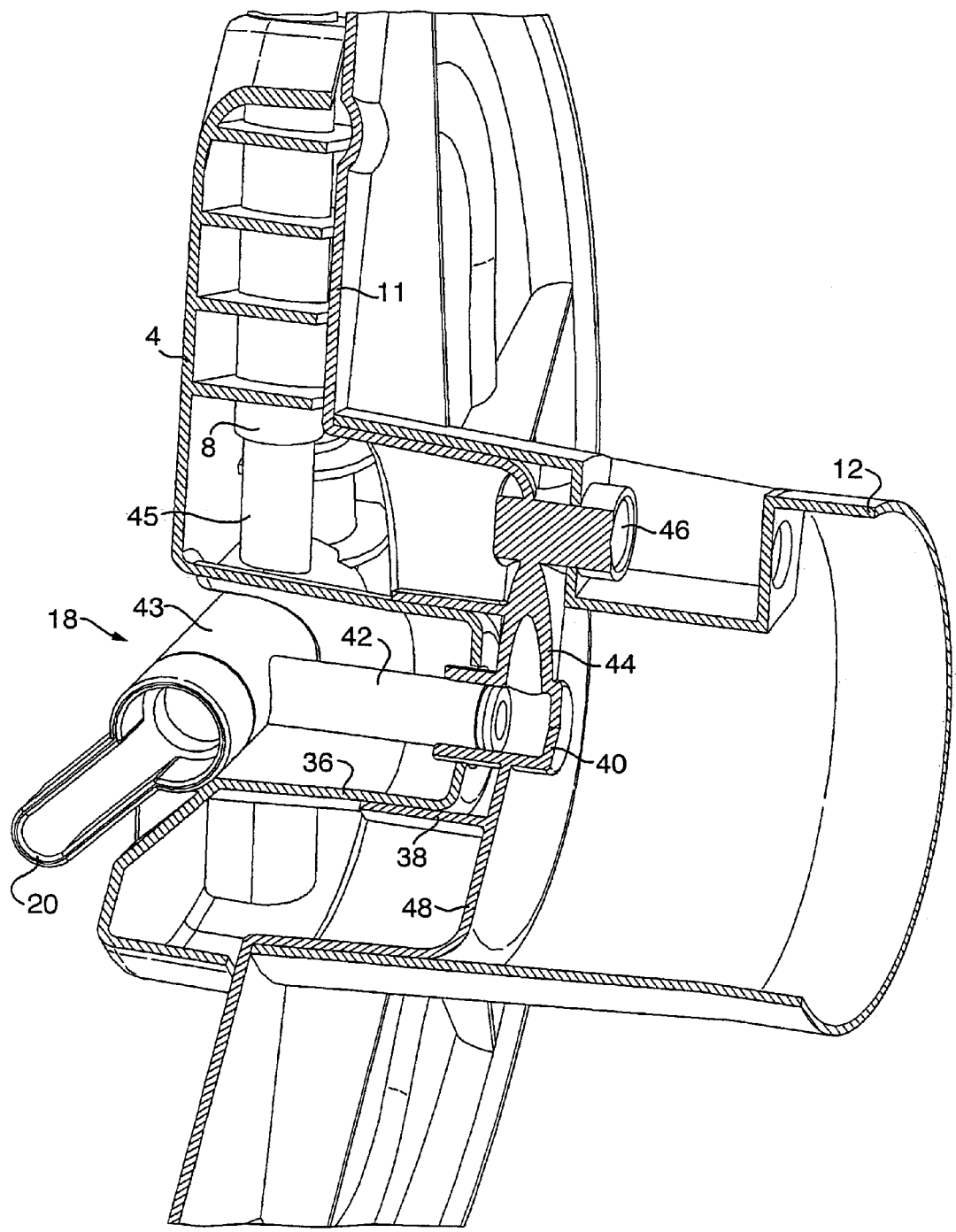

Further seen are two spaced-apart flanges 10, 11 on which, in a manner best illustrated in FIGS. 4 and 5, is mounted reel 12. Hose socket 14, to which the inner end of the watering hose is connected, can swivel about an axis parallel to the axis of reel 12, so as to prevent excessive bending stresses from acting on the hose.

Figure 6:
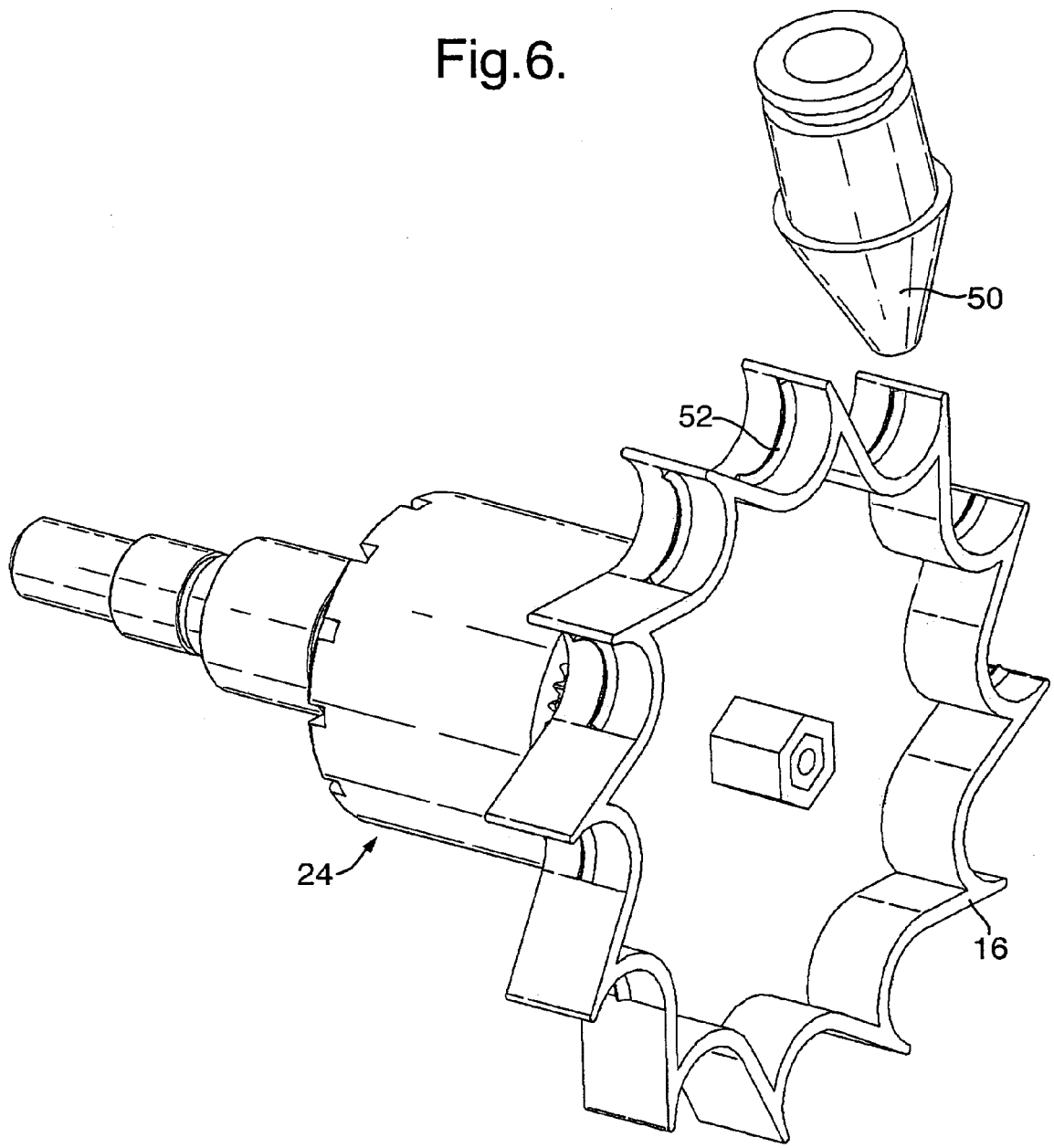

The turbine wheel 16 is seen to better advantage in FIG. 6 and discussed in conjunction with this Figure. Also seen in FIG. 1 is an exhaust channel 17. Not shown is a lid covering the turbine unit.

Figure 2:
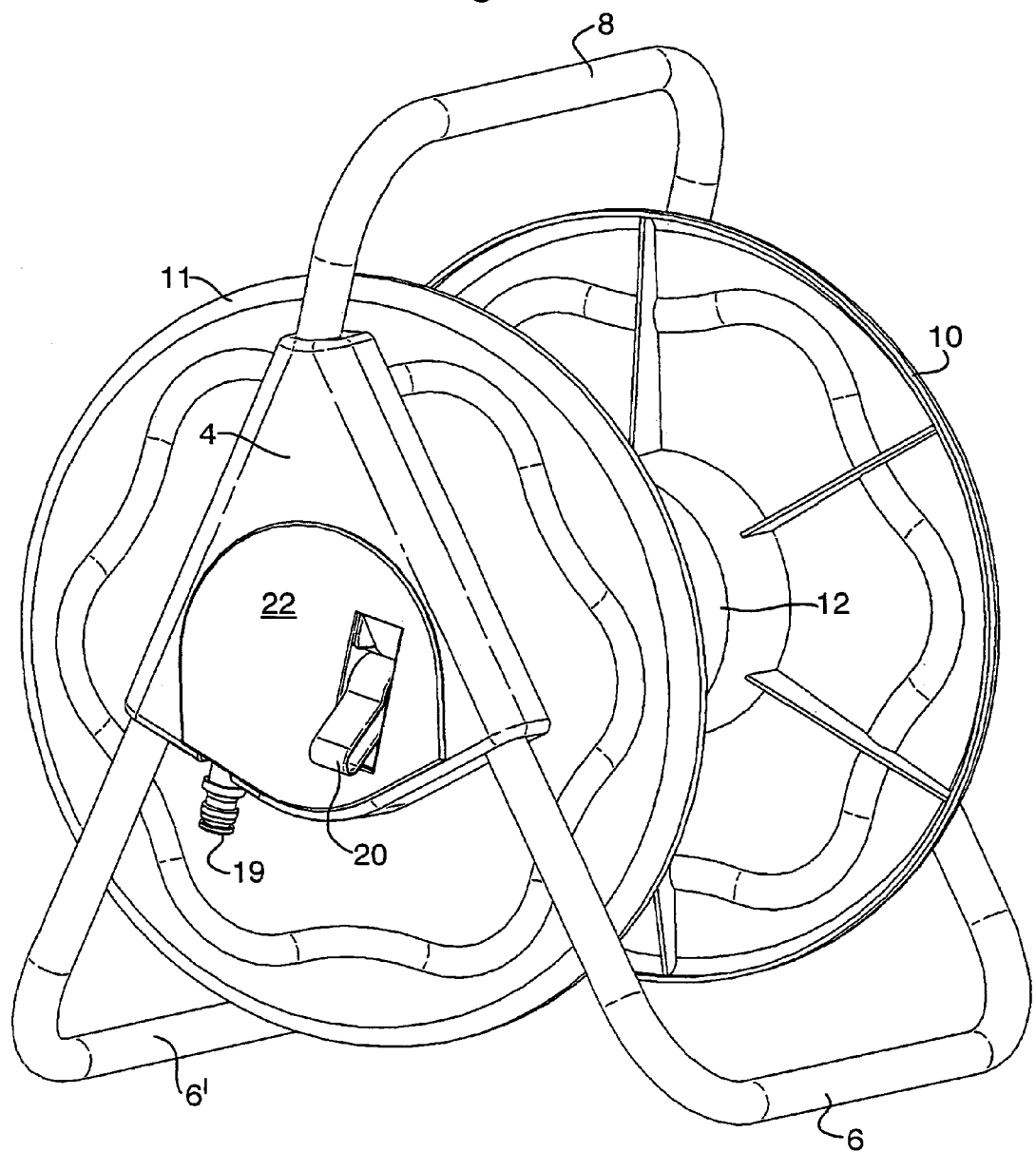

FIG. 2 shows the device according to the invention as seen from the other side. There is seen the water inlet 19 connectable to the water mains, a flippable valve handle 20, discussed further below, whereby the device can be switched over from the watering to the reeling-in function thereof, and a lid 22 to cover the valve seating.

While the flipping feature is indeed convenient, any other valve-actuating means could be use.

Figure 3:
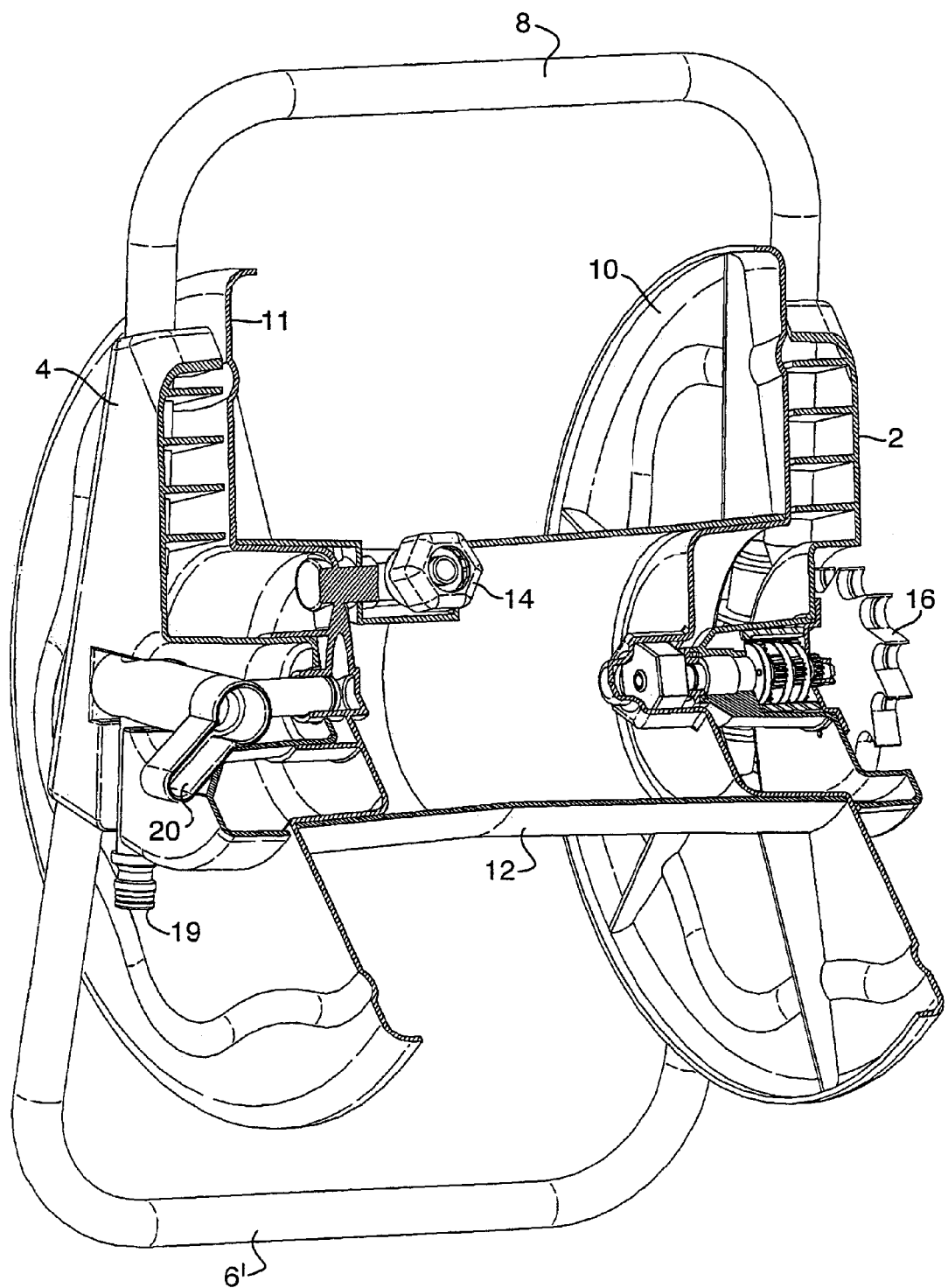

A general cross-section of the device is seen in FIG. 3, showing the ribbed mounting bodies 2, 4, flanges 10, 11, hose reel 12, hose socket 14, supporting member 6' tubular carrying handle 8, water inlet 19, flipping valve handle 20 and turbine 16. The mounting of the rotary parts of the device (flanges 10, 11) will be described in conjunction with FIGS. 4 and 5.

FIG. 4 is a cross-sectional view of the turbine side of the device (with turbine 16 seated in turbine housing 15, not shown for the sake of clarity), the central component in this Figure being a water-tight, sealed reduction gear 24 in the from of commercially available, preferably sintered metal gears, multi-stage planetary gear 24 (as manufactured, e.g., by Messrs. Black & Decker) having a reduction ratio of about 1:142, and a metal output shaft seated in a sleeve bearing, both having the required capacity in terms of load and moment. One end of gear 24 is supported by flange 26, which is fixedly attached to mounting body 2, a hub 28 advantageously integral with mounting body 2 providing further support. Fixedly attached to the output shaft of gear 24 is a polygonal nut 30, or any other drive key means, on which is seated, and by which is driven, a stepped, hollow projection 32 advantageously integral with flange 10. The outer narrower part of projection 32 is obviously of a cross-section fitting nut 30, or an alternative drive key.

The turbine-side end of reel 12 is tightly seated on the large diameter of projection 32 and clearly driven by it when the latter is set rotating by gear 24.

The input end 34 of gear 24 is advantageously hexagonal, fitting the central hole in turbine wheel 16, which is tightly connected to end 34 by a screw (not shown).

FIG. 5 is a cross-sectional view of the valve side of the device (with socket 14 not shown for sake of clarity). It is seen that mounting body 4 carries an integral hub 36 on which is rotatably supported a matching tubular part 38 of flange 11. Other advantageously integral parts of flange 11 include a first socket 40, into which fits a water outlet tube 42 originating in valve housing 43, a connecting tube 44 leading to a second socket 46 in which is rotatably seated a short length of pipe (not shown) about which hose socket 14 (FIG. 3) can swivel. Valve 18 and its parts are seen to better advantage in FIG. 8.

As with the other end of the device (FIG. 4), the end of reel 12 is tightly seated on projection 48 of flange 11.

FIG. 6 shows turbine wheel 16 and the jet-producing nozzle 50. Turbine 16 is preferably of the impact Pelton type and also shows the jet-splitting knife edges 52, representing a simplified version of the Pelton runner bucket. Nozzle 50 is tightly held in the turbine-side end of carrying handle 8, seen in FIG. 9.

Figure 7:
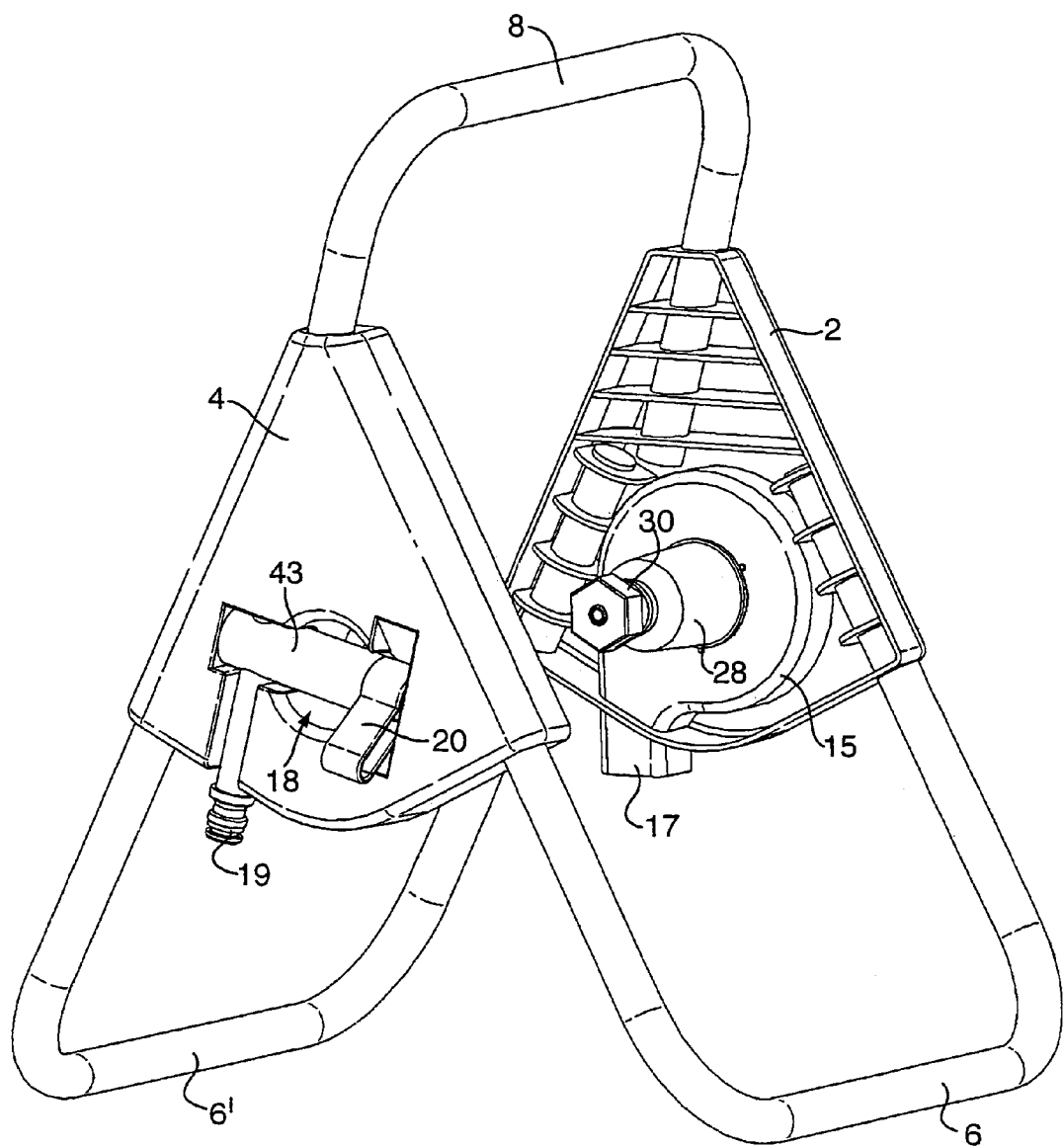

FIG. 7 represents the device without reel 12 and flanges 10,11. Clearly seen is turbine housing 15, hub 28 and polygonal nut 30. Also seen is the internal ribbing of mounting body 2 (which is similar to that of body 4), which ribbing also serves for the attachment of supporting members 6, 6' and of carrying handle 8. As is seen, all parts of valve 18, except handle 20, are accommodated in recesses in mounting member 4.

Figure 8:
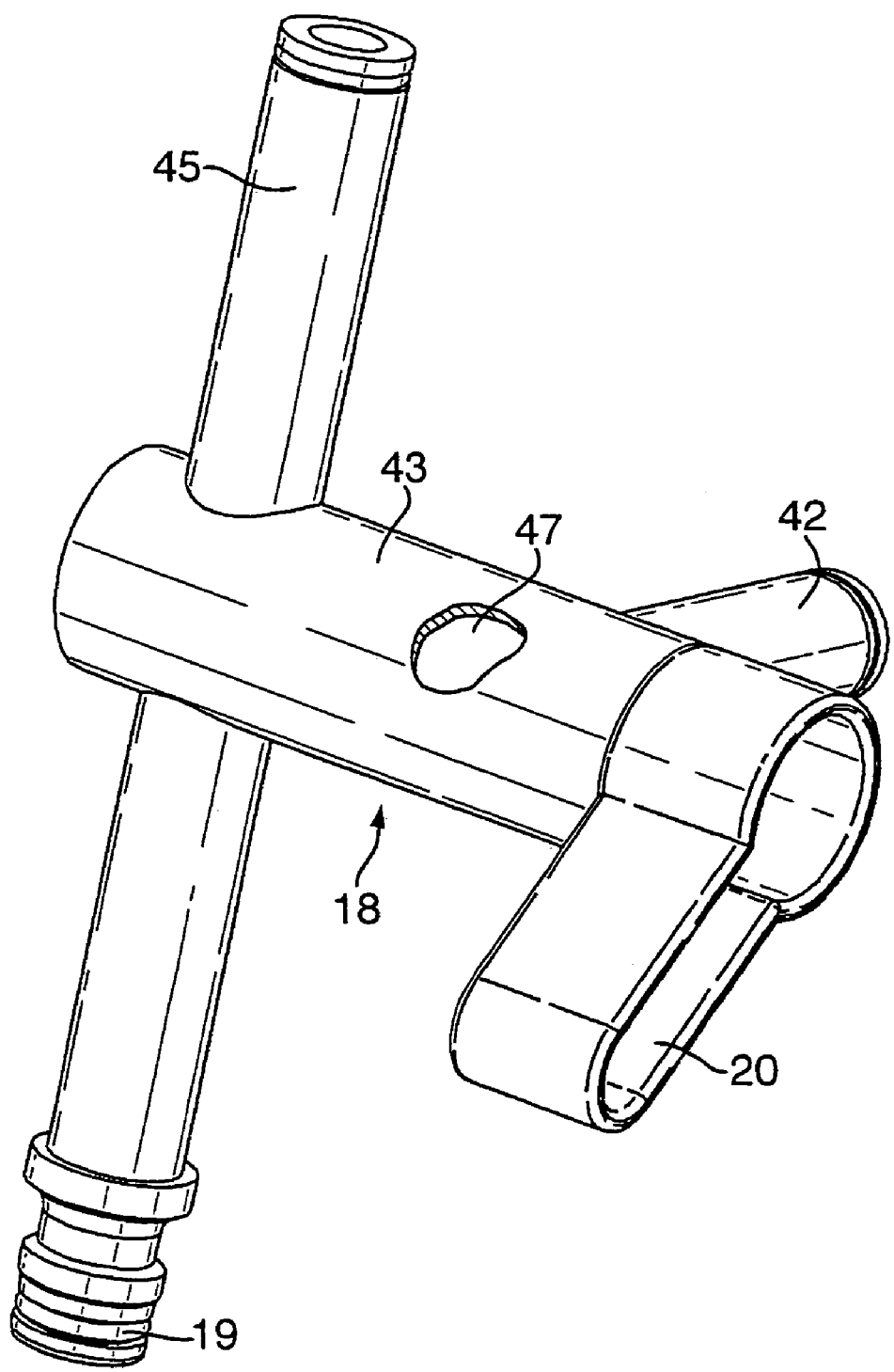

FIG. 8 represents valve 18, comprising water inlet 19 to be connected to the water mains, outlet tube 45 inserted into tubular carrying handle 8, valve housing 43 in which by flipping handle 20 and, thereby, valve body 47, valve 18 can be brought to a first position in which water from the mains is permitted to enter water outlet 42 on its way to the water hose through hose socket 14 (FIG. 1), and a second position in which this water is permitted to enter tube 45 on its way to turbine 16 via tubular carrying handle 8 and nozzle 50 (FIG. 9) to reel-in the hose.

Figure 9:
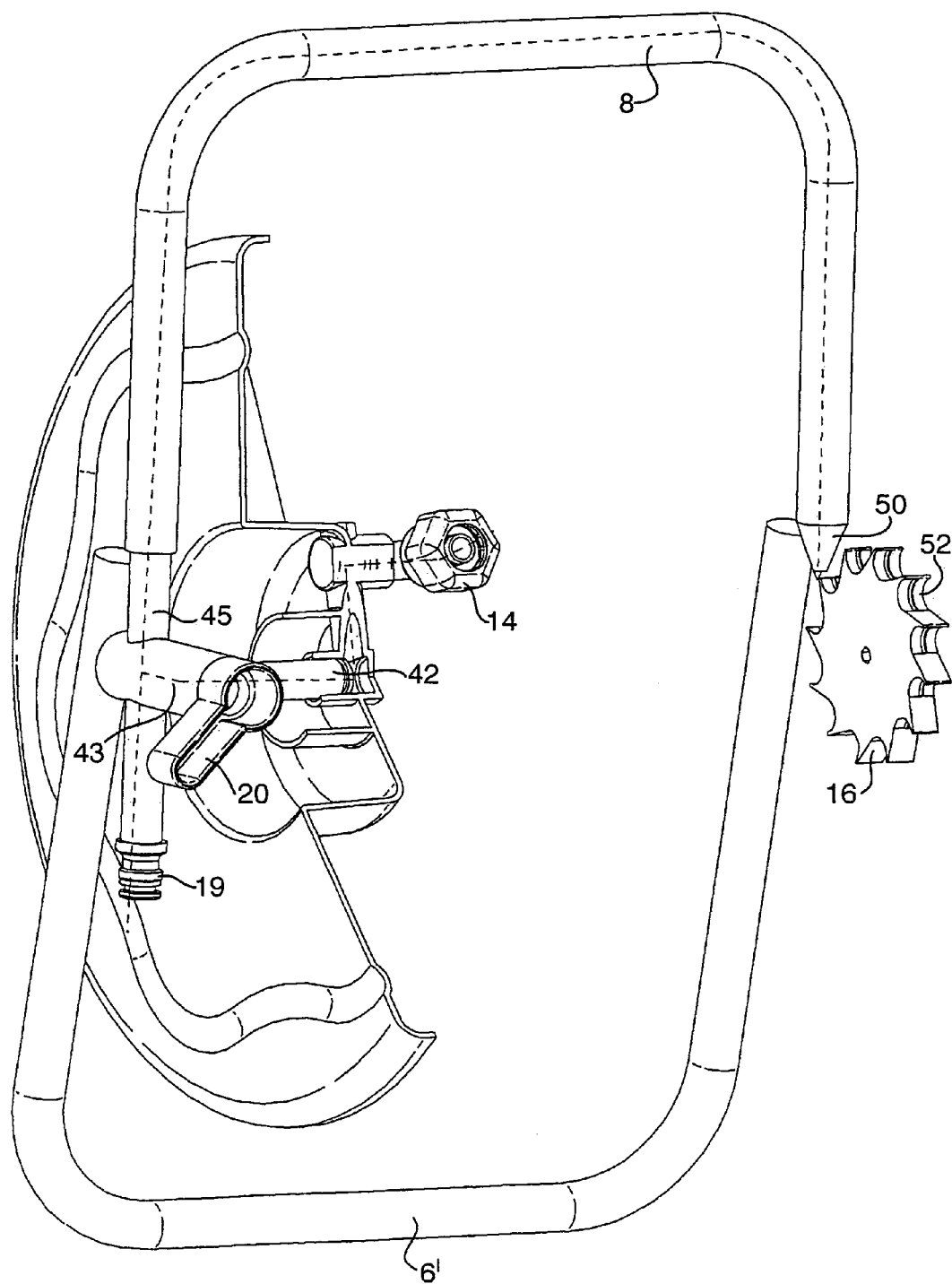

FIG. 9 shows the way that can be taken by the water: either through tube 45 on its way to nozzle 50 for causing reel 12 to rotate and reel-in the hose, or, by flipping handle 20, through tube 42 and hose socket 14 into the irrigation hose.

Experience has shown that the hose has the tendency to distribute quite uniformly across the reel, however, means per-se known can be provided to ensure perfect distribution. Also provided can be an automatic coupling attachment whereby rotation of reel 12 can be stopped when the hose has been completely reeled-in.

While the planetary reduction gearing shown in FIGS. 3 and 4 operates perfectly well to carry out the declared function of the invention, namely, the hydraulic reeling-in of the hose after its use, a certain difficulty may be experienced during the unreeling when reel 12, rotated by the unreeling hose, drives the multi-stage reduction gearing 24 in the reverse direction which, because of the relative high reduction ratio, might require a considerable amount of force necessitating the manual holding-down of the entire device to prevent it from being dragged along when the hose is pulled off for unreeling. To overcome this problem, the invention provides a further embodiment of the planetary gearing in which the mechanical connection between the reel 12 and the gearing can be interrupted, so that the planetary reduction gear is idling.

Figure 11:
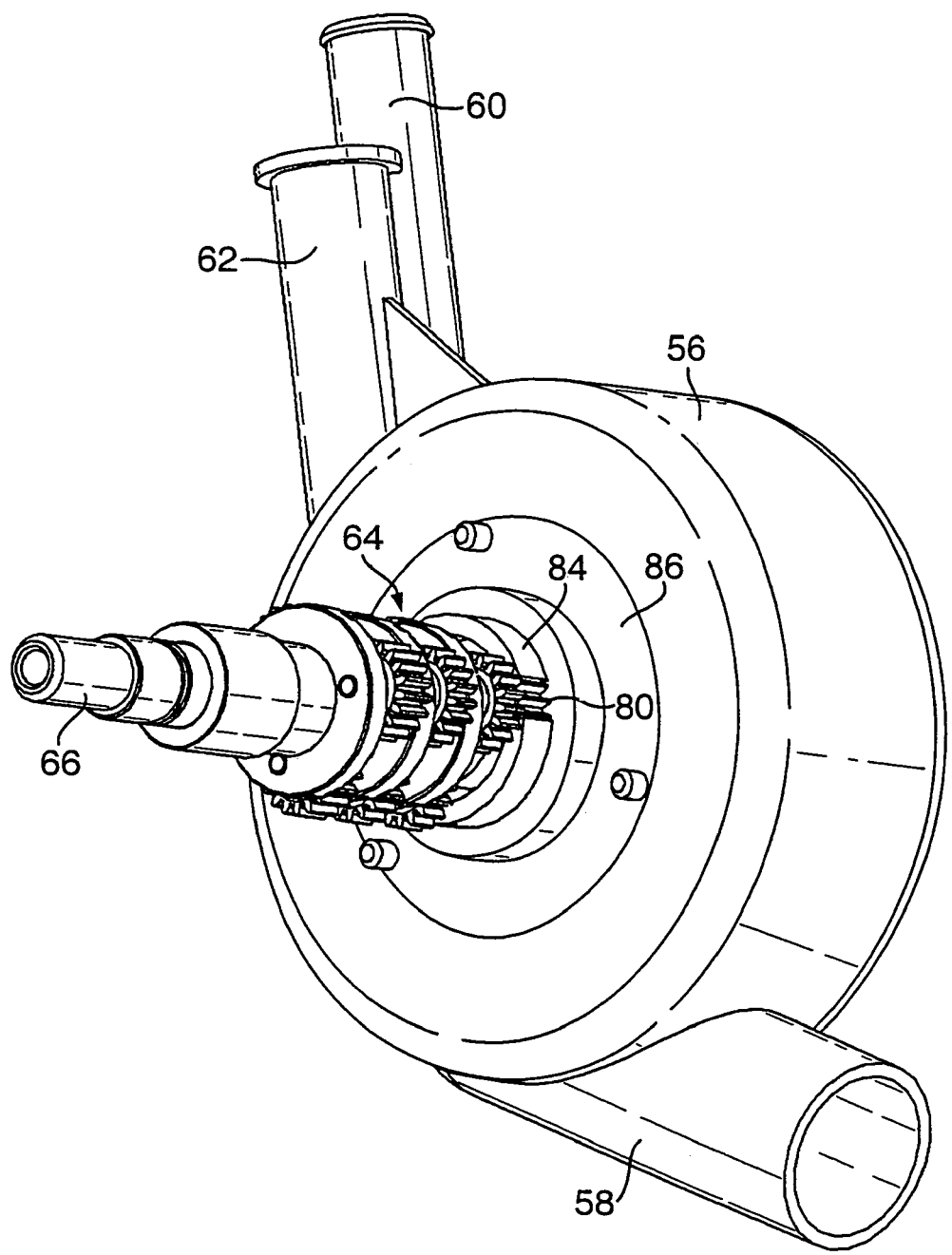

Referring to FIG. 10, there is seen a turbine wheel 54 rotatably mounted in a housing 56 having an outlet 58 and two inlet tubes 60 and 62. Turbine wheel 54 is kinematically connected to a planetary gearing 64 seen to better effect in FIGS. 11 and 12 which, via turbine wheel 54, drives an output shaft 66. FIG. 12 also depicts a crown gear 68 that is part of the planetary gearing 64 and, when arrested in a manner to be explained further below, will establish the speed-reducing connection between output shaft 66 and turbine wheel 54.

Behind turbine wheel 54 there is oscillatably mounted a lever 70 to the free end of which is linked a piston rod 72, which moves inside inlet tube 62 and, at its upper end, carries a piston 74 (FIGS. 13 and 14).

As seen in FIG. 15, lever 70 is fixedly attached to a shaft 76, the end of which is shaped to form a 3-lobed cam 78, rotation of which will kinematically interact with tooth segments 80 guided for translational movement in radial slots in rings 82 and 84 that are integral parts of flange 86 (FIG. 16).

When level 70 is moved by piston rod 72, the lobes of cam 78 push tooth segments 80 outwards, thereby engaging the internal teeth 88 of crown gear 68 (FIG. 12), thus rendering it stationary, planetary gearing 64 can begin to operate and start its speed-reducing function. When, in a manner to be explained below, the connection between tooth segments 80 and internal teeth 88 is interrupted, gearing 64 loses its speed reducing function, and the hose can be unreeled without the strong resistance offered by the planetary gearing when rotated in the reverse direction.

When piston 72, helped by compression spring 90 (FIG. 17) is allowed to return, lever 70 is raised and cam 78 permits tooth segments 80 to disengage from the internal teeth of crown gear 68, assisted by the circular restoring spring 92.

Upon the introduction of water under pressure into inlet tube 60, water exits via nozzle 94 to impact and drive turbine wheel 54, exiting via outlet 58. At the same time, water entering inlet tube 62 via a small aperture (not shown) in the wall section separating inlet tubes 60 and 62 (the upper end of which is closed by a plug, not shown), impacts piston 74, pushing it down against the restoring force of spring 90 and, via lever 70, acting on planetary gearing 64, as described above. When the water is turned off and spring 90 returns piston 74 to its upper position, tooth segments 80 can withdraw from internal teeth 88 of crown gear 68, with the above-described results.

Not shown is the bottom of inlet tube 62 (FIG. 13) which has a substantially cross-shaped opening, fitting the cross-shaped cross-section of piston rod 72 and serving as an abutment for the lower end of spring 90 (FIG. 17).

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An A hydraulic reeling-in device for a water-transmitting, flexible garden hose, said device comprising:
   mounting means having two opposite, first and second sides and including ground contacting supporting elements;
   a hose reel mounted for rotation on said mounting means between said two sides;
   hydraulic drive means kinematically connected to said hose reel and mounted on the first side of said mounting means;
   a water inlet attached to the second side of said mounting means and connectable to a water-supplying pipe line;
   a water outlet leading to a point at the periphery of said hose reel and provided with a connector for said hose;
   valve means located on the second side of said mounting means and having two positions, a first position in which said water is permitted to pass from said water inlet through said water outlet into said hose, and a second position in which water is permitted to pass from said water inlet to said hydraulic drive means in order to reel-in said hose; and
   a tubular member connected to said mounting means and adapted, in the second position of said valve means, to conduct water from the valve means on said second side to said hydraulic drive means on said first side of the mounting means.

2. The device as claimed in claim 1, wherein said hydraulic drive means comprises a multi-stage planetary reduction gear driven by a turbine wheel.

3. The device as claimed in claim 2, wherein said turbine wheel is a Pelton-type impact turbine wheel.

4. The device as claimed in claim 1, wherein said tubular member is substantially U-shaped and has a water-inlet-side end, and a drive means-side end.

5. The device as claimed in claim 1, wherein said tubular member is in the form of a carrying handle extending across said mounting means.

6. The device as claimed in claim 5, wherein said Pelton-type turbine wheel is impacted by a water jet produced by a nozzle attached to the drive-means-side end of said handle.

7. The device as claimed in claim 3, wherein said Pelton-type turbine wheel is provided with jet-splitting knife edges.

8. The device as claimed in claim 1, wherein said connector is swivelable about an axis substantially parallel to the axis of said reel.

9. The device as claimed in claim 2, further comprising tooth segments actuatable by cam means which, in one position, cause said tooth segments to engage a crown gear of said multi-stage planetary gearing, and in a second position, cause said tooth segments to disengage from said crown gear, whereby the mechanical connection between said reel and said gearing can be interrupted.

10. The device as claimed in claim 9, wherein said cam means is actuated by a lever linked to a piston rod carrying a piston.

11. The device as claimed in claim 10, wherein said piston rod and said piston are located in a water inlet tube end and are actuated by water applied thereto.

12. The device as claimed in claim 9, wherein said tooth segments are radially movable against the restoring force of a spring.

13. The device as claimed in claim 11, wherein said piston rod and piston are actuated against the restoring force of a spring.

* * * * *